United States Patent
Takizawa et al.

(10) Patent No.: US 7,877,125 B2
(45) Date of Patent: Jan. 25, 2011

(54) PORTABLE TERMINAL DEVICE

(75) Inventors: Kazuyuki Takizawa, Chigasaki (JP); Masahito Togami, Higashiyamato (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 338 days.

(21) Appl. No.: 12/197,810

(22) Filed: Aug. 25, 2008

(65) Prior Publication Data

US 2009/0054111 A1  Feb. 26, 2009

(30) Foreign Application Priority Data

Aug. 23, 2007  (JP) .............................. 2007-217651

(51) Int. Cl.
    *H04M 1/00*  (2006.01)
(52) U.S. Cl. .............. 455/575.4; 455/575.1; 455/575.3; 381/365; 379/433.03
(58) Field of Classification Search .............. 455/575.1, 455/575.3, 575.4, 550.1; 381/365; 379/433.03, 379/433.11, 433.12
    See application file for complete search history.

(56) References Cited

U.S. PATENT DOCUMENTS

| | | | | | |
|---|---|---|---|---|---|
| 5,818,701 | A * | 10/1998 | Shindo | ........................ | 361/814 |
| 6,674,996 | B1 * | 1/2004 | Weckstrom | ................ | 455/90.3 |
| 6,795,719 | B2 * | 9/2004 | Miyashita et al. | ........ | 455/575.3 |
| 7,010,327 | B1 * | 3/2006 | Griffith et al. | ................ | 455/564 |
| 7,023,338 | B1 * | 4/2006 | Foth | ...................... | 340/539.13 |
| 7,107,018 | B2 * | 9/2006 | Jellicoe | ...................... | 455/90.3 |
| 7,187,958 | B2 * | 3/2007 | Nishijima et al. | ........ | 455/575.3 |
| 7,346,315 | B2 * | 3/2008 | Zurek et al. | ................ | 455/90.3 |
| 7,499,737 | B2 * | 3/2009 | Mizuta et al. | ............ | 455/575.3 |
| 7,512,414 | B2 * | 3/2009 | Jannard et al. | ........... | 455/556.1 |
| 7,526,326 | B2 * | 4/2009 | Vance et al. | ............. | 455/575.7 |
| 7,567,830 | B2 * | 7/2009 | Hur | ........................ | 455/575.4 |
| 7,667,962 | B2 * | 2/2010 | Mullen | .................. | 361/679.56 |
| 7,711,396 | B2 * | 5/2010 | Kim | ........................ | 455/575.1 |
| 7,738,656 | B2 * | 6/2010 | Yoda | ..................... | 379/433.01 |
| 2004/0204194 | A1 * | 10/2004 | Akai et al. | ................ | 455/575.1 |
| 2005/0020327 | A1 * | 1/2005 | Chung et al. | ............. | 455/575.3 |
| 2005/0181820 | A1 * | 8/2005 | Ono | ........................ | 455/550.1 |
| 2005/0221867 | A1 * | 10/2005 | Zurek et al. | ............. | 455/569.1 |
| 2005/0239516 | A1 * | 10/2005 | Gonopolskiy | ............... | 455/570 |
| 2006/0223596 | A1 * | 10/2006 | Hur | ........................ | 455/575.4 |

OTHER PUBLICATIONS

M. Togami et al., "Auditory Ability of Human-Symbiotic robots 'EMIEW'", Japanese Society for Artificial Intelligence Technical Report, pp. 59-64, Oct. 14, 2005.

* cited by examiner

*Primary Examiner*—Lewis G West
(74) *Attorney, Agent, or Firm*—Cohen Pontani Lieberman & Pavane LLP

(57) ABSTRACT

A portable terminal device can extrapolate the position of a sound source in the thicknesswise direction regardless of the use style. A slide type portable terminal has an upper casing, a lower casing, and a coupling part that couples the casings in such a way that their positional relation is changeable. The upper casing has a plurality of first microphones, and the lower casing has a second microphone. In a handhold style, one of the first microphones and the second microphone are lined in the thicknesswise direction of the cellular phone. As the upper casing is slid, the other one of the first microphones and the second microphone are lined in the thicknesswise direction of the cellular phone. The position of a sound source in the thicknesswise direction can be extrapolated from output signals of a formed microphone array in the thicknesswise direction.

8 Claims, 13 Drawing Sheets

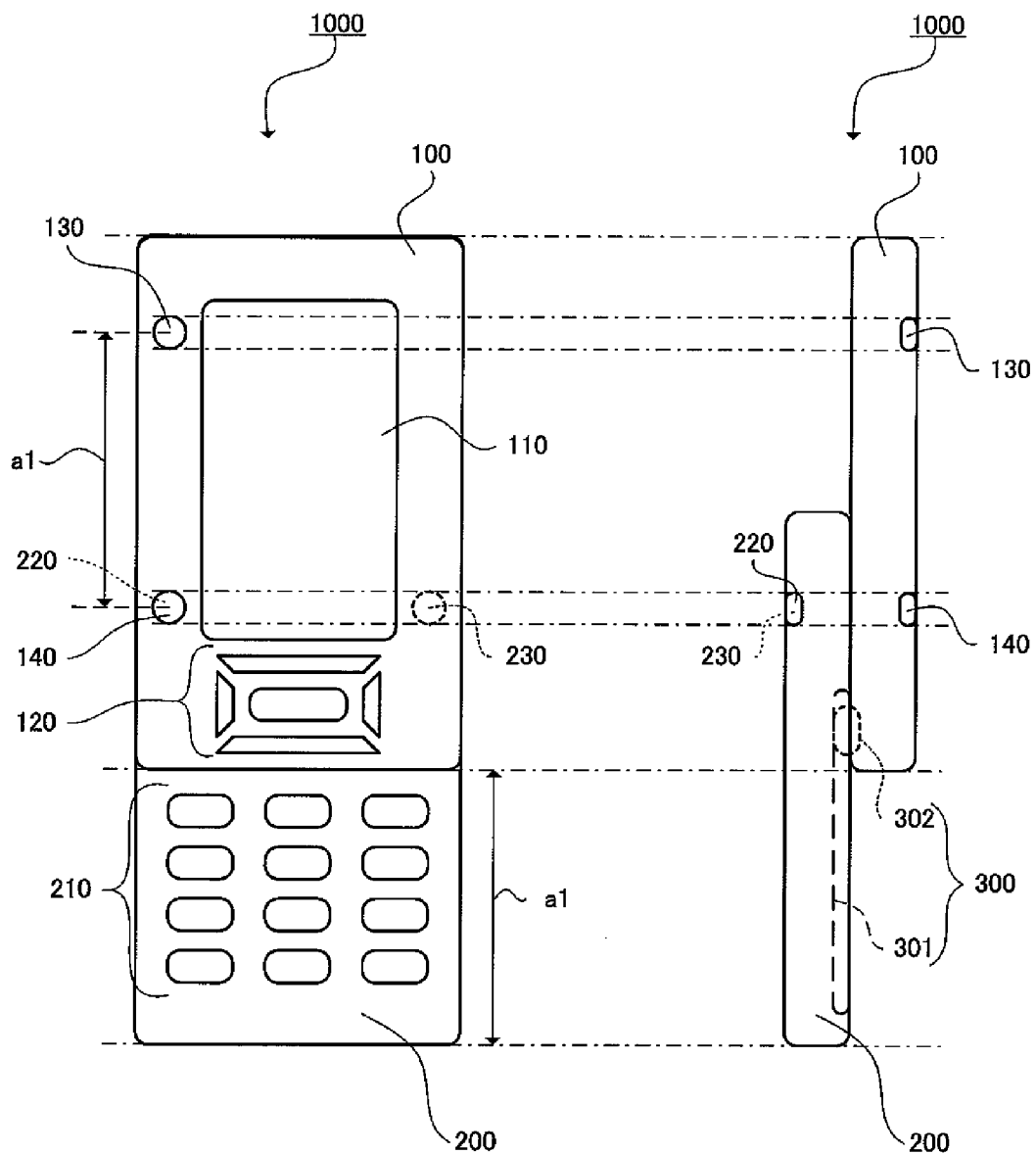

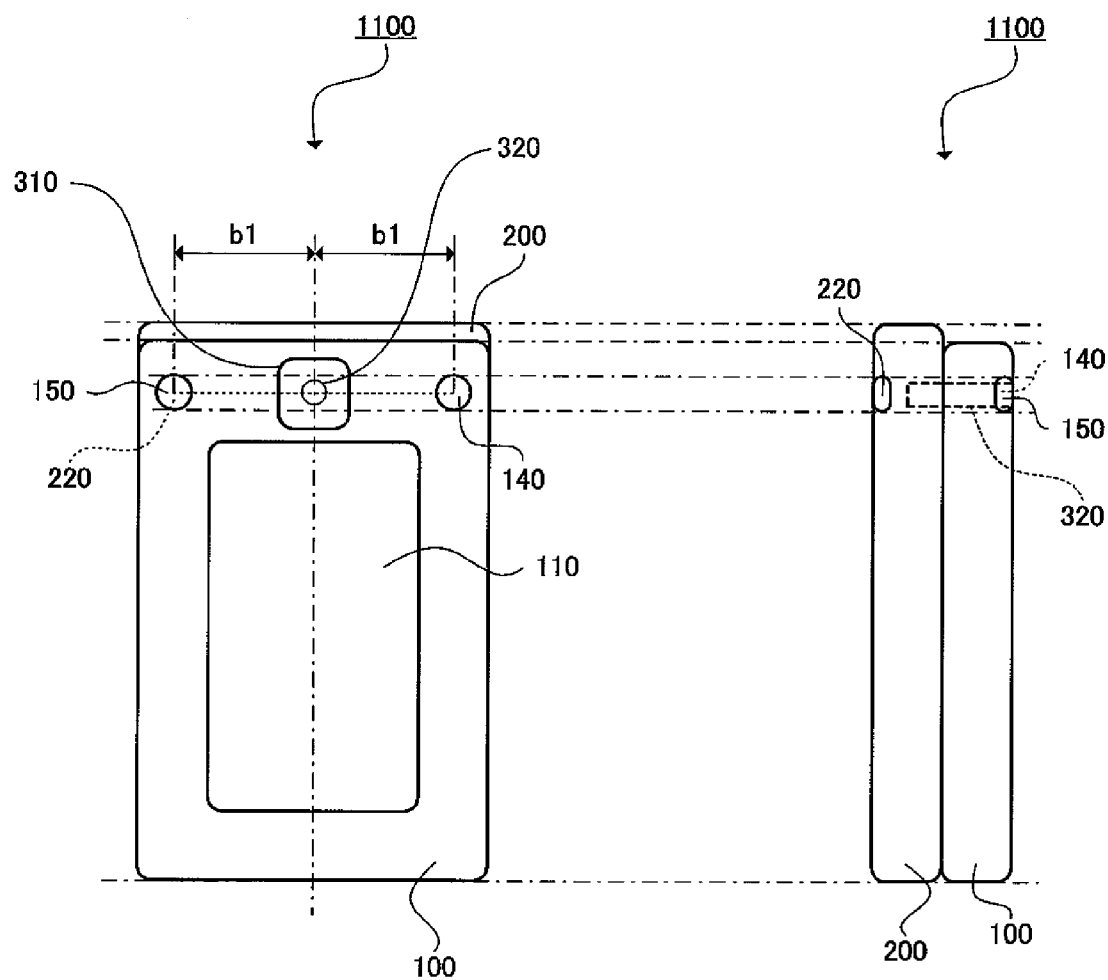

FIG.10A
FIG.10B
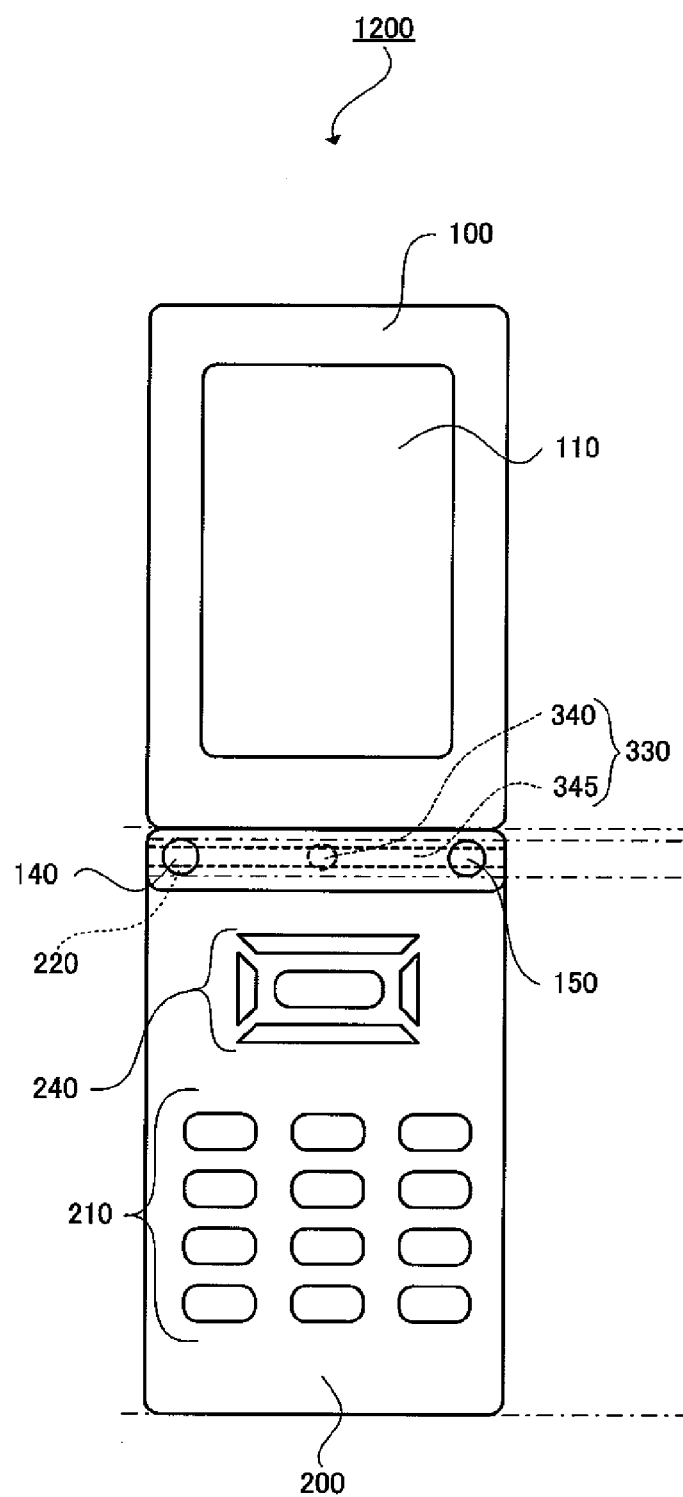
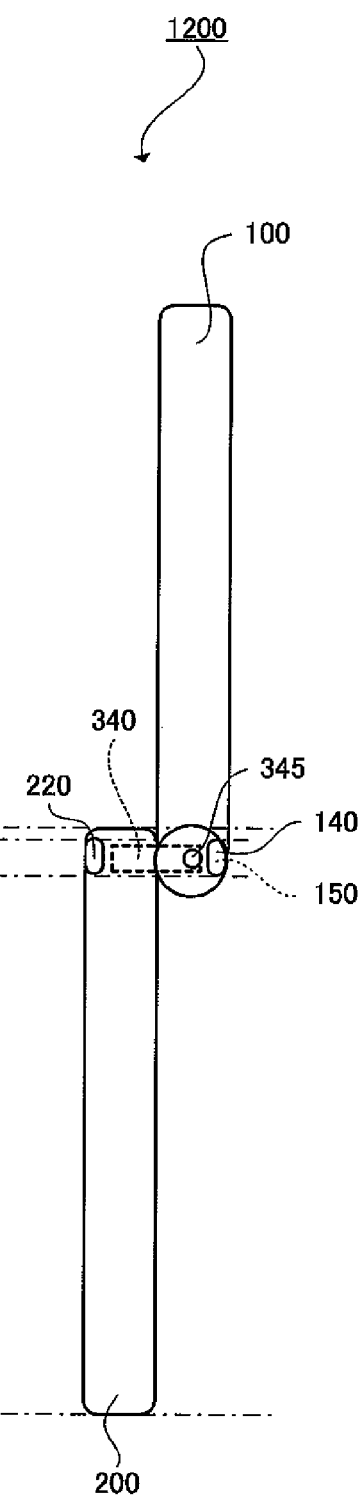

FIG.11A
FIG.11B
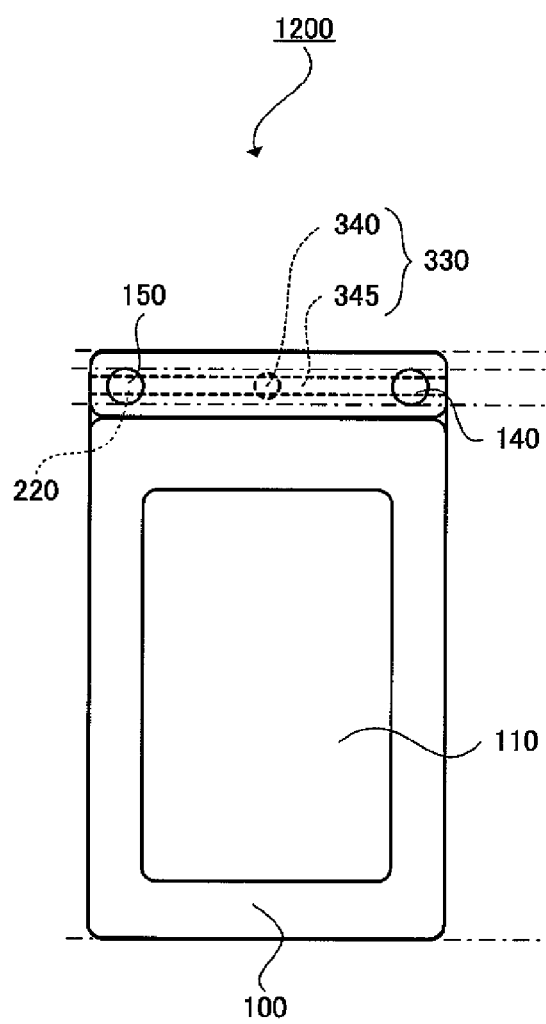
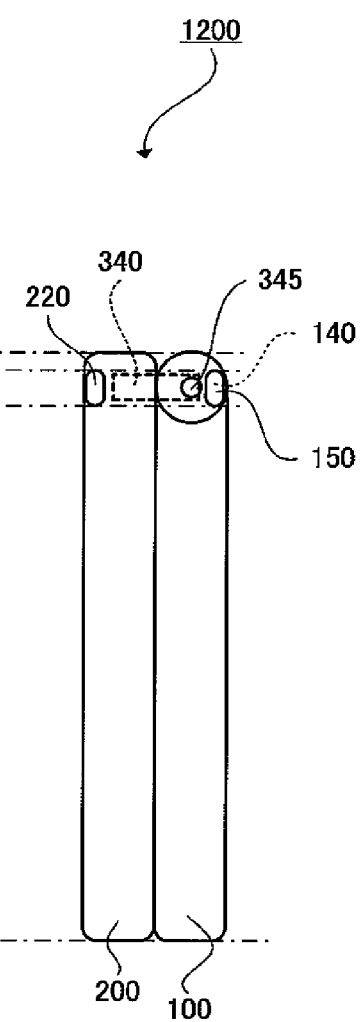

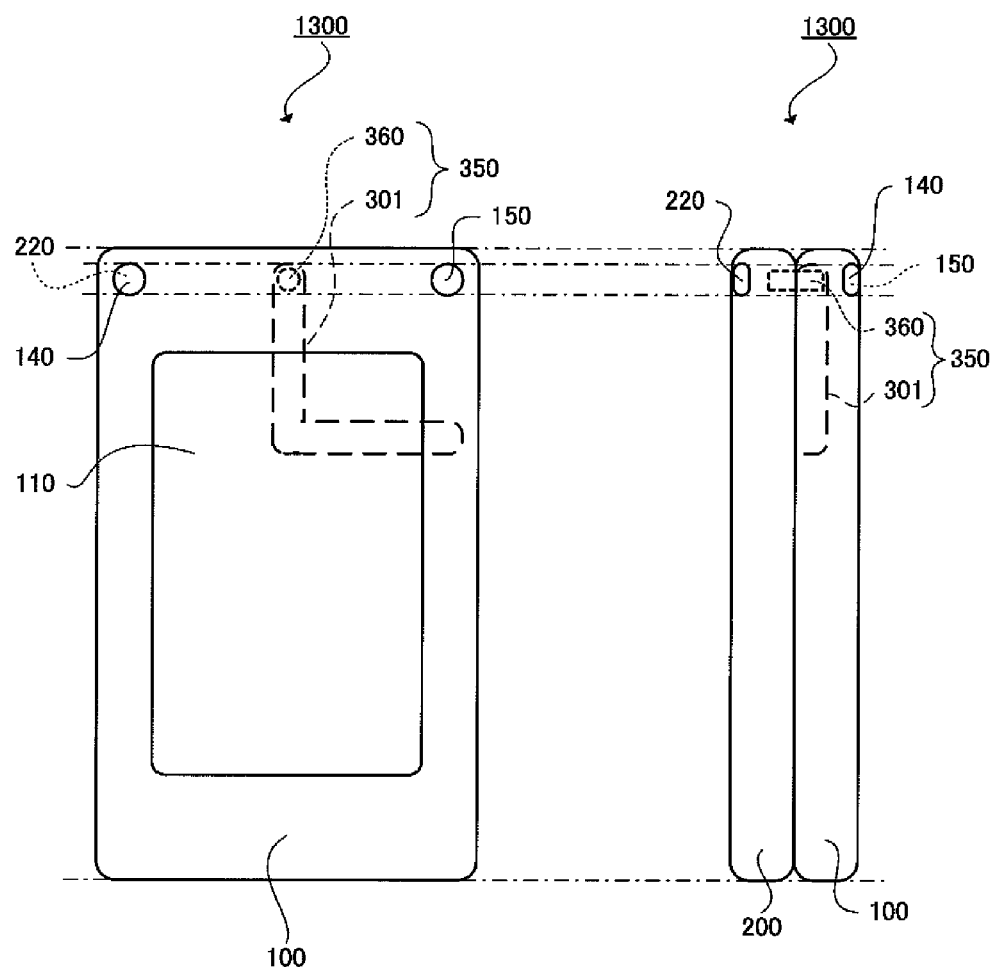

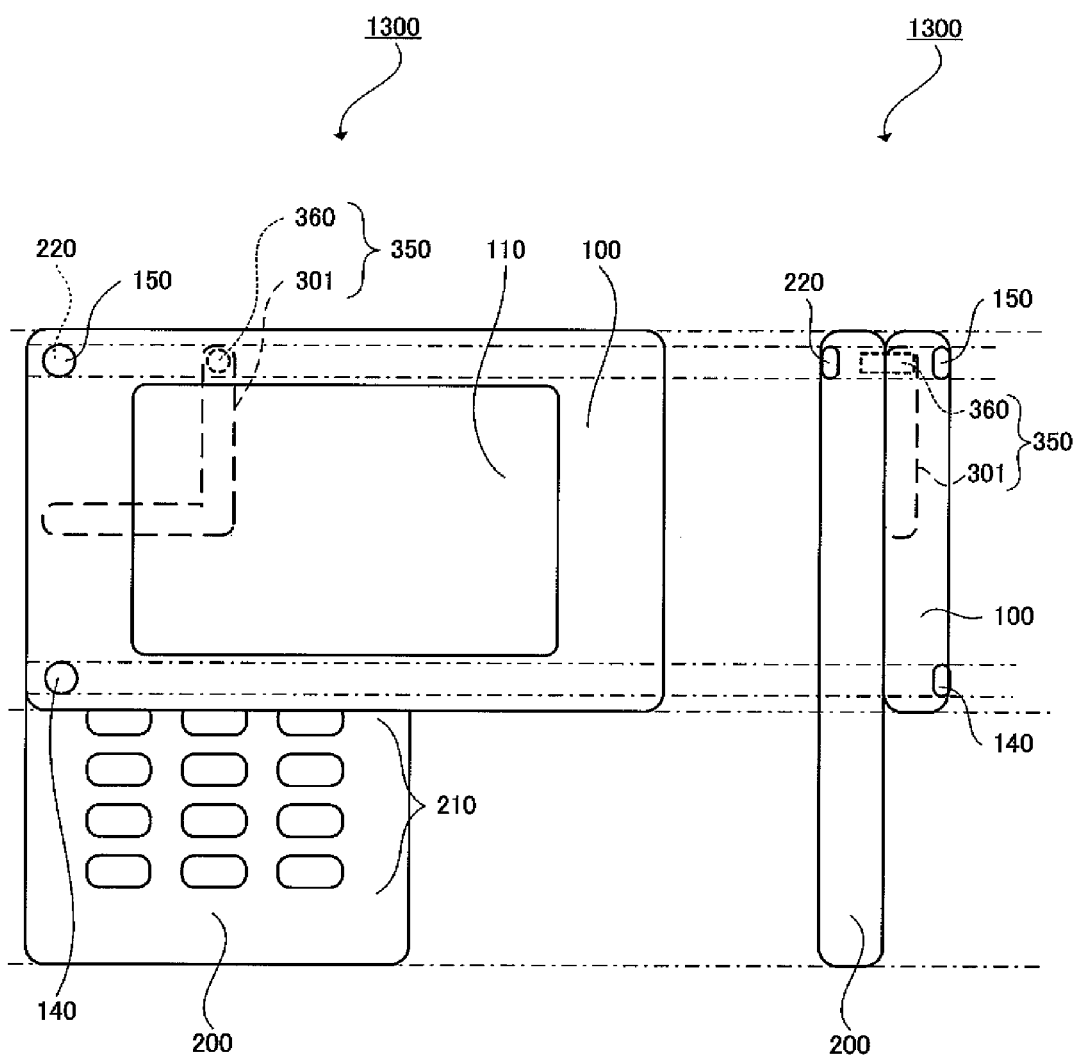

PORTABLE TERMINAL DEVICE

BACKGROUND OF THE INVENTION

1. Field of the Invention

The present invention relates to a portable terminal device which can change a use style.

2. Description of the Related Art

There are known a sound source direction extrapolation technique of extrapolating the direction of a sound source from sounds acquired by a microphone array including a plurality of microphones, and a sound source separating technique of canceling ambient noise based on the extrapolated direction of the sound source.

For example, Non-patent Document, "Auditory Ability of Human-Symbiotic robots 'EMIEW'" by Masahito TOGAMI, Akio AMANO, Hiroshi SHINJO, Ryota KAMOSHIDA, Junichi TAMAMOTO, and Saku EGAWA by the Japanese Society for Artificial Intelligence, Oct. 14, 2005, pp. 59-64", discloses a sound source direction extrapolate technique and a sound source separation technique using a microphone array. The techniques disclosed in Non-patent Document can separate voices of a speaker from ambient noise.

The techniques disclosed in Non-patent Document are adapted to, for example, cellular phone terminals or the like to contribute to the improvement of the quality of talking. When a plurality of microphones are arranged to line in the thicknesswise direction of a cellular phone terminal, for example, the position of a sound source present in the thicknesswise direction can be extrapolated by using the techniques disclosed in Non-patent Document, and voices supplied from other directions as noise can be attenuated based on the extrapolated position of the sound source.

A portable terminal device, such as a cellular phone terminal, is desired to be small-sized, light and thin. This often makes it difficult to form a microphone array by arranging a plurality of microphones on a single casing so as to line in the thicknesswise direction of the portable terminal device. In such a case, it is effective to form a microphone array by distributing microphones to a plurality of casings.

SUMMARY OF THE INVENTION

In a case where microphones are arranged in a distributed manner in a portable terminal device which takes a plurality of use styles, such as "open state" and "closed state", however, changing the use style changes the arrangement of the microphones. Depending on the use style, therefore, a plurality of microphones may not be arranged to line in the thicknesswise direction of the portable terminal device, and the sound source direction extrapolate function in the thicknesswise direction may not be demonstrated.

Accordingly, it is an object of the present invention to provide a portable terminal device configured to have a plurality of microphones arranged to line in the thicknesswise direction of the portable terminal device regardless of use style.

To achieve the object, a portable terminal device according to the present invention includes:
a first casing having a plurality of first microphones;
a second casing having a second microphone; and
a coupling part that couples the first casing and the second casing in such a way that the first casing and the second casing are changeable between a first arrangement state and a second arrangement state,
wherein the plurality of first microphones and the second microphone are arranged in such a way that in each of the first arrangement state and the second arrangement state, at least one of the plurality of first microphones and the second microphone line in a thicknesswise direction of the portable terminal device.

The present invention can be configured so that microphones to be arranged provided at the individual casings line in the thicknesswise direction of the portable terminal device, regardless of use style of the portable terminal device.

BRIEF DESCRIPTION OF THE DRAWINGS

These objects and other objects and advantages of the present invention will become more apparent upon reading of the following detailed description and the accompanying drawings in which:

FIG. 5A is a front view showing a handhold style of a slide type cellular phone according to a second embodiment;

FIG. 5B is a side view showing the handhold style of the slide type cellular phone according to the second embodiment;

FIG. 8A is a front view showing a desktop style of the cellular phone according to the third embodiment;

FIG. 8B is a side view showing the desktop style of the cellular phone according to the third embodiment;

FIG. 10A is a front view showing a handhold style of the cellular phone according to the fourth embodiment;

FIG. 10B is a side view showing the handhold style of the cellular phone according to the fourth embodiment;

FIG. 11A is a front view showing a desktop style of the cellular phone according to the fourth embodiment;

FIG. 11B is a side view showing the desktop style of the cellular phone according to the fourth embodiment;

FIG. 12A is a front view showing a desktop style of a cellular phone according to a fifth embodiment;

FIG. 12B is a side view showing the desktop style of the cellular phone according to the fifth embodiment;

FIG. 13A is a front view showing a handhold style of the cellular phone according to the fifth embodiment; and FIG. 13B is a side view showing the handhold style of the cellular phone according to the fifth embodiment.

DETAILED DESCRIPTION OF THE PREFERRED EMBODIMENTS

Figure 1:
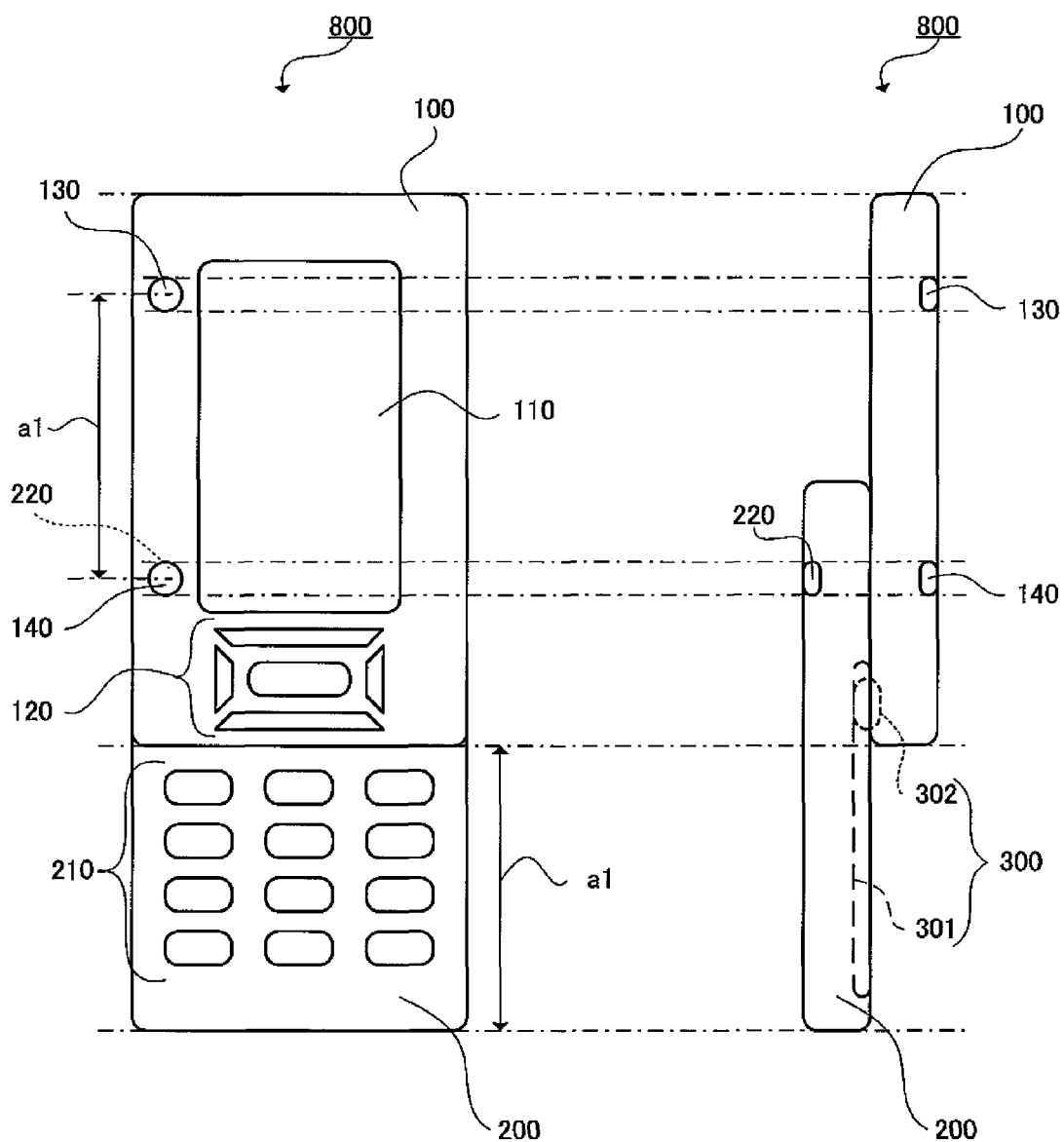
FIG. 1A is a front view showing a handhold style of a slide type cellular phone according to a first embodiment of the invention.
FIG. 1B is a side view showing the handhold style of the slide type cellular phone according to the first embodiment.

Portable terminal devices according to preferred embodiments of the present invention will be described below with reference to the accompanying drawings. To avoid the redundant description, like or same reference numerals are given to those components which are the same or corresponding components in the diagrams.

First Embodiment

A portable terminal device according to a first embodiment of the invention will be described by way of a cellular phone as an example.

A cellular phone 800 according to the embodiment is a slide type cellular phone device including an upper casing 100, a lower casing 200 and a slide part 300 as shown in FIGS. 1A, 1B, 2A and 2B.

Figure 2:
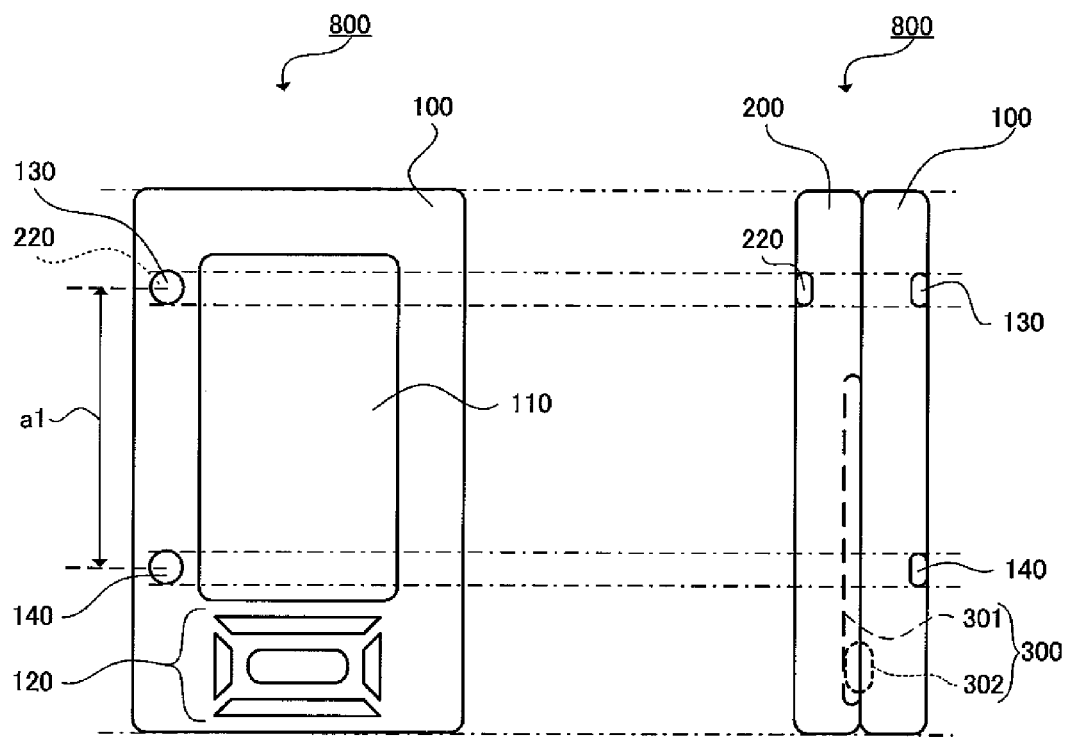
FIG. 2A is a front view showing a desktop style of the slide type cellular phone according to the first embodiment.
FIG. 2B is a side view showing the desktop style of the slide type cellular phone according to the first embodiment.

The slide part 300 supports the upper casing 100 and the lower casing 200 in a mutually slidable manner. The slide part 300 enables switching between two styles, a handhold style (first arrangement state) shown in FIGS. 1A and 1B, and a desktop style (second arrangement state) shown in FIGS. 2A and 2B. As shown in FIGS. 1B and 2B, the slide part 300 has a groove-like guide 301 formed on the top surface of the lower casing 200, and an engagement part 302 which is formed on the bottom surface of the upper casing 100 and is engaged with the guide 301 to be movable therealong. The slide part 300 can ensure slide movement (single axial movement) of the upper casing 100 along the guide 301 by a distance a1.

The upper casing 100 has a display unit 110, an arrow pad 120, a microphone 130 (first microphone), and a microphone 140 (first microphone). The microphones 130 and 140 are arranged on the top surface of the upper casing 100, apart from each other by the distance a1 in the slide direction of the upper casing 100. The microphones 130 and 140 are electret condenser microphones or the like.

The lower casing 200 supports the upper casing 100 via the slide part 300, and has a key 210 and a microphone 220 (second microphone) arranged thereon.

The microphone 220 is an electret condenser microphone or the like, and is arranged on the bottom surface of the lower casing 200.

The microphone 220 is lined with (overlies) the microphone 140 in the thicknesswise direction of the cellular phone 800 in the handhold style shown in FIGS. 1A and 1B, and is lined with (overlies) the microphone 130 in the thicknesswise direction of the cellular phone in the desktop style shown in FIGS. 2A and 2B.

In other words, the microphone 130 is arranged to line with the microphone 220 in the thicknesswise direction of the cellular phone 800 in the desktop style, while the microphone 140 is arranged to line with the microphone 220 in the thicknesswise direction of the cellular phone 800 in the handhold style.

That is, the microphone 130 and the microphone 140 are arranged in such a way that in either the handhold style or the desktop style, at least one of the microphone 130 and the microphone 140, and the microphone 220 line with in the thicknesswise direction of the cellular phone 800.

Next, the circuit configuration of the cellular phone 800 will be described. The following describes a sound source direction extrapolate circuit 900 which extrapolates the position of a sound source in the thicknesswise direction of the cellular phone 800 (forward and backward direction in normal use state).

Figure 3:
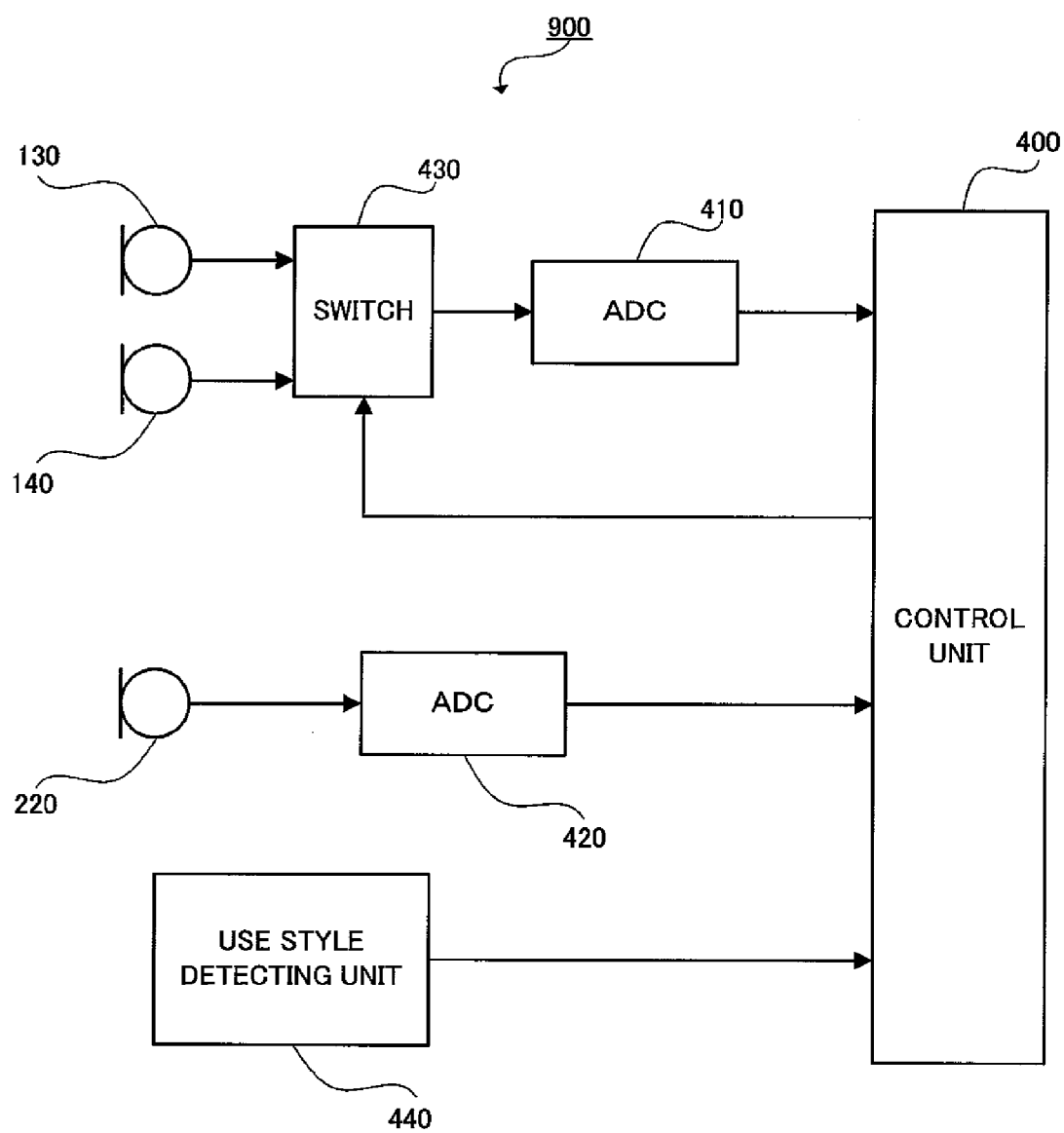
FIG. 3 is a block diagram showing a circuit configuration of the cellular phone.

The sound source direction extrapolate circuit 900 includes a microphone 130, a microphone 140, a microphone 220, a control unit 400, an analog-digital converter (hereinafter "ADC") 410, an ADC 420, a use style detecting unit 440, and a switch 430, as shown in FIG. 3.

As mentioned above, the microphone 130 and the microphone 140 are arranged at the upper casing 100 apart from each other by the distance a1. An output signal of the microphone 130 and an output signal of the microphone 140 are supplied to the switch 430.

The switch 430 includes a multiplexer or the like. The switch 430 selects one of the output signal of the microphone 130 and the output signal of the microphone 140 under the control of the control unit 400, and supplies the selected output signal to the ADC 410.

The ADC 410 converts the signal supplied from the switch 430, namely, one of the output signal of the microphone 130 and the output signal of the microphone 140, to a digital signal, and supplies the digital signal to the control unit 400.

The microphone 220 is arranged at a position facing the microphone 130 or the microphone 140 disposed at the upper casing 100, as mentioned above, and the output signal is supplied to the ADC 420.

The ADC 420 converts the output signal of the microphone 220 to a digital signal, and supplies the digital signal to the control unit 400.

The use style detecting unit 440 includes a microswitch, a magnet switch or the like, and is arranged at, for example, the slide part 300. The use style detecting unit 440 determines whether the cellular phone 800 is in the desktop style or in the handhold style. Then, the use style detecting unit 440 supplies a determination signal indicating the result of the determination to the control unit 400.

The control unit 400 includes a microprocessor or the like. The control unit 400 performs a normal voice talking process or the like and a sound source direction extrapolate process to extrapolate the position of a sound source in the thicknesswise direction of the cellular phone. When a plurality of microphones are arranged to line in the thicknesswise direction of the cellular phone 800, the control unit 400 can extrapolate the position of a sound source present in the thicknesswise direction based on the information such as the phase and amplitude of the output signal of each microphone. Therefore, the control unit 400 can execute a process or the like of canceling noise based on the extrapolated position of the sound source.

When the cellular phone 800 is in the handhold style, the control unit 400 controls the switch 430 to select the output signal of the microphone 140. When the cellular phone 800 is in the desktop style, the control unit 400 controls the switch 430 to select the output signal of the microphone 130.

Next, a description will be given of the process of acquiring the position of a sound source in the thicknesswise direction (forward and backward direction) of the cellular phone 800 of the cellular phone 800 having the foregoing configuration.

First, suppose that the cellular phone 800 is in the handhold style shown in FIGS. 1A and 1B. In this case, the use style detecting unit 440 determines that the cellular phone 800 is in the handhold style, and sends a determination signal indicating the determination result to the control unit 400. The control unit 400 controls the switch 430 to select the microphone 140 according to the determination signal.

Under control of the control unit 400, the switch 430 selects the output signal of the microphone 140 arranged at the upper casing 100, and supplies the output signal to the ADC 410. The ADC 410 performs AD conversion of the output signal of the microphone 140, and supplies the digital signal to the control unit 400.

The output signal of the microphone 220 arranged at the lower casing 200 is converted by the ADC 420 to a digital signal which is in turn supplied to the control unit 400.

In the handhold style, the microphone 220 and the microphone 140 selected by the switch 430 are arranged to line in the thicknesswise direction of the cellular phone 800. In this case, the control unit 400 extrapolates the position of a sound source in the thicknesswise direction of the cellular phone 800 by using the supplied output signal of the microphone 140 and the output signal of the microphone 220.

Suppose that a user then changes the style of the cellular phone 800 to the desktop style shown in FIGS. 2A and 2B from the handhold style shown in FIGS. 1A and 1B.

When detecting a change in use style, the use style detecting unit 440 switches the determination signal to inform the control unit 400 of the use state of the cellular phone 800 being the desktop style.

The control unit 400 controls the switch 430 in response to the determination signal supplied from the use style detecting unit 440 to select the output signal of the microphone 130 arranged at the upper casing 100. The switch 430 supplies the output signal of the microphone 130 to the ADC 410 under control of the control unit 400. The ADC 410 performs AD conversion of the output signal of the microphone 130, and supplies the digital signal to the control unit 400.

The output signal of the microphone 220 arranged at the lower casing 200 is converted to a digital signal by the ADC 420 to be supplied to the control unit 400.

In the desktop style, the microphone 130 selected by the switch 430 and the microphone 220 are arranged to line in the thicknesswise direction of the cellular phone 800. In this case, the control unit 400 extrapolates the position of a sound source in the thicknesswise direction of the cellular phone 800 using the output signal of the microphone 130 and the output signal of the microphone 220.

Based on the position of the sound source extrapolated in the above manner, the control unit 400 also performs a process of attenuating, for example, a voice from a direction different from the sound source direction in the input voices, to reduce noise, thus improving the quality of talking.

In the cellular phone 800 according to the embodiment, as described above, when the cellular phone 800 is in the handhold style as well as in the desktop style, one of the microphone 130 (first microphone) and the microphone 140 (first microphone), arranged at the upper casing 100, and the microphone 220 (second microphone) arranged at the lower casing 200 are arranged to be lined with (overlie) each other in the thicknesswise direction of the cellular phone 800, that is, the forward and backward direction. Therefore, the position of a sound source in the forward and backward direction can be specified by using the output signals of the two microphones (first microphone and second microphone) arranged to be lined with each other in the thicknesswise direction. Specifying the position of the sound source can ensure high-quality talking or the like.

Figure 4:
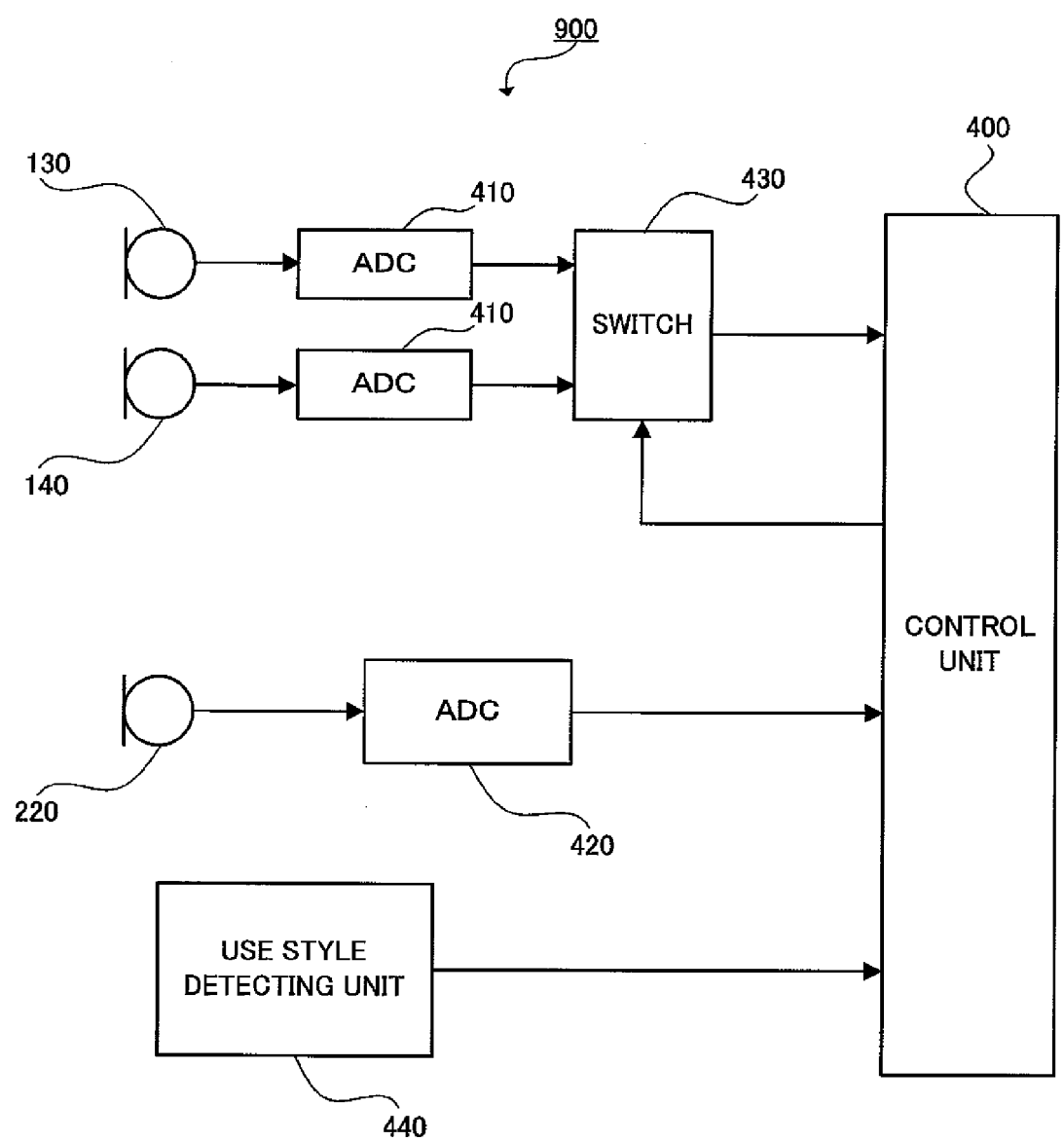
FIG. 4 is a block diagram showing a modification of the circuit configuration shown in FIG. 3.
Figures 6A, 6B:
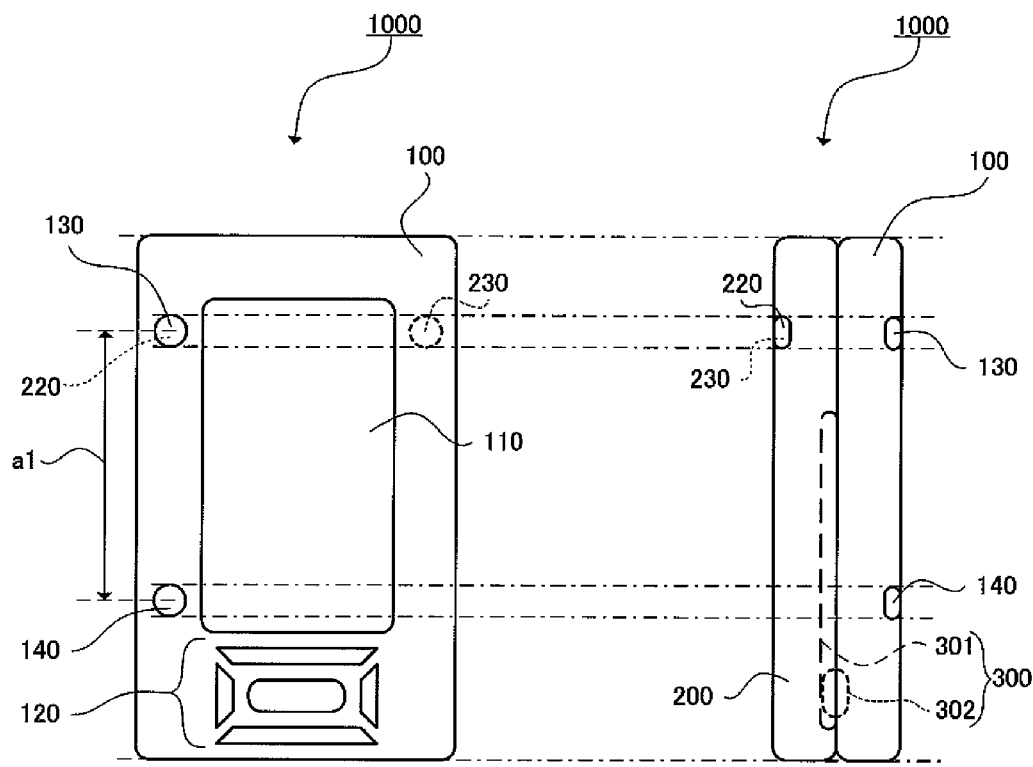
FIG. 6A is a front view showing a desktop style of the slide type cellular phone according to the second embodiment.
FIG. 6B is a side view showing the desktop style of the slide type cellular phone according to the second embodiment.

In the foregoing description of the embodiment, the sound source direction extrapolate circuit has been described to have the circuit configuration shown in FIG. 3, in which one of the output signal of the microphone 130 and the output signal of the microphone 140 is selected by the switch 430, and is subjected to AD conversion before being supplied to the control unit 400. The present invention is not limited to this configuration. For example, the circuit configuration as shown in FIG. 4 may be taken, so that the output signal of the microphone 130 and the output signal of the microphone 140 are subjected to AD conversion by the ADC 410, and one of the signals after the AD conversion is selected by the switch 430 before supplied to the control unit 400.

The output signals of the microphone 130, the microphone 140 and the microphone 220 may be subjected to AD conversion before being supplied to the control unit 400, which in turn determines whether or not to use each signal according to the style.

In the example described above, the control unit 400 determines the position of a sound source in the thicknesswise direction (forward and backward direction) of the cellular phone 800. In addition, the control unit 400 may acquire the position of a sound source in the longitudinal direction of the cellular phone 800 (line connecting the microphone 130 and the microphone 140). In this case, each of the output signals of the microphone 130, the microphone 140 and the microphone 220 is subjected to AD conversion before being supplied to the control unit 400.

In the embodiment, a plurality of microphones are arranged at the upper casing 100, and a single microphone is arranged at the lower casing 200. The present invention is not limited to this arrangement, and a single microphone may be arranged at the upper casing 100, and a plurality of microphones may be arranged at the lower casing 200. Even in this case, the microphone at the upper casing 100 and the microphones at the lower casing 200 are arranged to line in the thicknesswise direction of the cellular phone. Then, the position of a sound source in the thicknesswise direction of the cellular phone 800 can be specified regardless of the use style.

Second Embodiment

In the first embodiment, a plurality of microphones are arranged at one casing, and a single microphone is arranged at the other casing. However, a plurality of microphones may be arranged at both casings.

A cellular phone 1000 has a microphone 230 at a lower casing 200 in addition to the microphone 130, the microphone 140, and the microphone 220, as shown in FIGS. 5A, 5B, 6A and 6B.

In this case, the microphone 130 and the microphone 140 arranged at the upper casing 100 are disposed in the slide direction at an interval equal to the distance a1.

The microphone 220, which is one of a plurality of microphones arranged at the lower casing 200, is lined with the microphone 130 or the microphone 140, arranged at the upper casing 100, in the thicknesswise direction of the cellular phone 1000 in the handhold style as well as in the desktop style. This makes it possible to specify the position of a sound source in the thicknesswise direction, regardless of the style.

Further, the position of a sound source in the longitudinal direction of the cellular phone 1000 (direction of the line connecting the microphone 130 and the microphone 140) can be acquired by using the output signal of the microphone 130 and the output signal of the microphone 140. The use of the output signal of the microphone 220 and the output signal of the microphone 230 can ensure acquisition of the position of a sound source in the lateral direction of the cellular phone 1000 (direction of the line connecting the microphone 220 and the microphone 230). This makes it possible to acquire the position of a sound source in three-dimensional space.

Third Embodiment

The description of the embodiments has been given of the configuration in which the upper casing 100 and the lower casing 200 slide. However, the present invention can be widely adapted to various kinds of terminal devices in which the arrangement of a plurality of casings changes, in addition to the slide type ones. For example, the present invention can be adapted to a cellular phone of the type in which two casings rotate about the rotation axis. An embodiment of this type of cellular phone will be described referring to FIGS. 7A, 7B, 8A and 8B.

A cellular phone 1100 according to the embodiment, as shown in FIGS. 7A, 7B, 8A and 8B, includes the upper casing 100, the lower casing 200 and a rotating mechanism 310. The basic structures of the upper casing 100 and the lower casing 200 are similar to those of the first embodiment.

The rotating mechanism 310 has a rotation axis 320 penetrating the upper center of the lower casing 200 and the lower center of the upper casing 100. Then, the rotating mechanism 310 has both casings coupled together so that the lower casing 200 and the upper casing 100 rotate about the rotation axis 320. As the upper casing 100 and the lower casing 200 rotate, the cellular phone 1100 can be switched between the handhold style shown in FIGS. 7A and 7B and the desktop style shown in FIGS. 8A and 8B.

The microphone 140 and a microphone 150 are arranged at the upper casing 100. The microphone 140 and the microphone 150 are arranged at a point-symmetrical position with respect to the rotation axis 320. That is, the rotation axis 320, the microphone 140 and the microphone 150 are arranged on a straight line, and the distance from the rotation axis 320 to the microphone 140 and the distance from the rotation axis 320 to the microphone 150 are both b1.

Figures 7A, 7B:
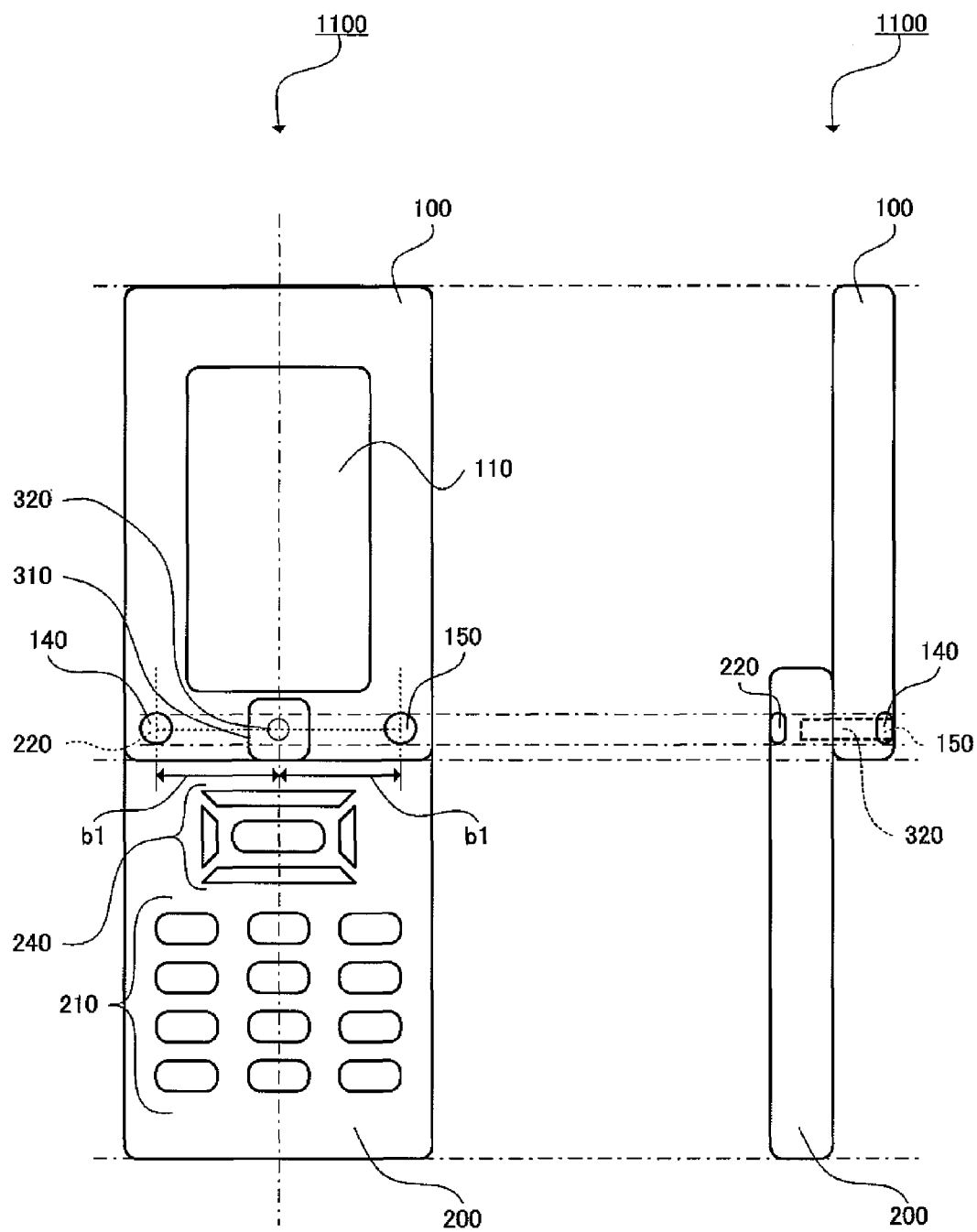
FIG. 7A is a front view showing a handhold style of a cellular phone according to a third embodiment.
FIG. 7B is a side view showing the handhold style of the cellular phone according to the third embodiment.

When the upper casing 100 is rotated about the rotation axis 320 by 180 degrees in the handhold style shown in FIGS. 7A and 7B, the cellular phone 1100 comes to the desktop style shown in FIGS. 8A and 8B.

The microphone 140 and the microphone 150, arranged at the upper casing 100, and the microphone 220 arranged at the lower casing 200 are arranged in such a way that the microphone 140 and the microphone 220 are lined in the thicknesswise direction (forward and backward direction) of the cellular phone 1100 in the handhold style, and the microphone 150 and the microphone 220 are lined in the thicknesswise direction of the cellular phone 1100 in the desktop style.

Even when the use style of the cellular phone is changed, therefore, a plurality of microphones are arranged in the thicknesswise direction of the cellular phone. It is therefore possible to constitute a microphone array which can detect the position of a sound source in the thicknesswise direction of the cellular phone regardless of the use style of the cellular phone.

The configuration of the sound source direction extrapolate circuit of the cellular phone 1100 is the same as that of the circuit configuration shown in FIG. 3 or FIG. 4, except that the microphone 130 is replaced with the microphone 150.

When the cellular phone 1100 is in the handhold style shown in FIGS. 7A and 7B, the control unit 400 instructs the switch 430 to select the output signal of the microphone 140 (or signal after AD conversion thereof). The control unit 400 performs the sound source direction extrapolate process in the thicknesswise direction of the cellular phone 1100 using the output signal of the microphone 140 provided at the upper casing 100 and the output signal of the microphone 220 provided at the lower casing 200.

Suppose then that the user has changed the style of the cellular phone 1100 to the desktop style shown in FIGS. 8A and 8B. In accordance with the determination signal from the use style detecting unit 440, the control unit 400 causes the switch 430 to select and output the output signal of the microphone 150 (or signal after AD conversion thereof). The control unit 400 performs the sound source direction extrapolate process in the thicknesswise direction of the cellular phone 1100 using the output signal of the microphone 150 provided at the upper casing 100 and the output signal of the microphone 220 provided at the lower casing 200.

Even when the use style of the cellular phone according to the embodiment is changed, a plurality of microphones are lined in the thicknesswise direction of the cellular phone 1100 in the above manner. Accordingly, a microphone array is constituted, so that the position of a sound source in the thicknesswise direction of the cellular phone 1100 can be extrapolated.

The cellular phone 1100 according to the embodiment has two microphones, i.e. the microphone 140 and the microphone 150, arranged in a point symmetrical position with the rotation axis 320 being the center, and has one microphone 220 arranged at the lower casing 200. However, the present invention is not limited to this arrangement, and microphones may be arranged in an inversed position at the upper and lower casings. That is, similar advantages can be acquired even by arranging one microphone at the upper casing 100, and arranging two microphones at the lower casing 200 in a point symmetrical position with respect to a predetermined rotation axis being the center.

Fourth Embodiment

The description of the first to the third embodiments has been given of the configuration where two casings perform a single axial operation. However, the present invention can be adapted to a configuration where a plurality of casings perform a multi-axial operation. Such an example will be described referring to FIGS. 9A, 9B, 10A, 10B, 11A and 11B.

A cellular phone 1200 according to the embodiment has the upper casing 100 and the lower casing 200 connected together by a rotating mechanism 330 which includes two axes, namely, a rotation axis 340 and a rotation axis 345.

Figures 9A, 9B:
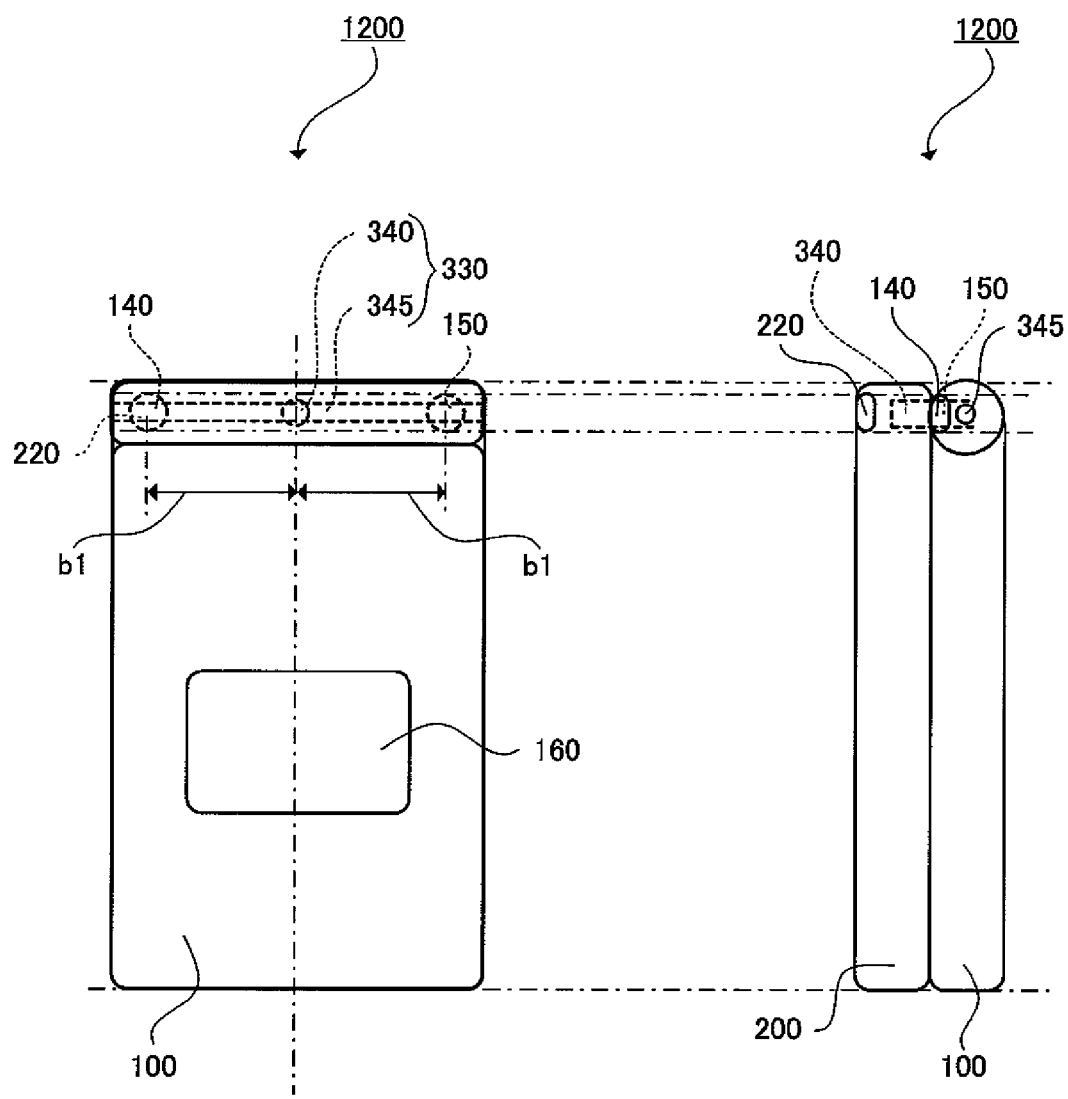
FIG. 9A is a front view showing a basic style of a cellular phone according to a fourth embodiment.
FIG. 9B is a side view showing the basic style of the cellular phone according to the fourth embodiment.

As the upper casing 100 is rotated about the rotation axis 345, the cellular phone 1200 comes to a handhold style shown in FIGS. 10A and 10B where the upper casing 100 and the lower casing 200 are open, from a basic style shown in FIGS. 9A and 9B where the upper casing 100 is closed. While the cellular phone 1200 has a microphone 140 and the microphone 150 arranged inside the upper casing 100 (i.e., on the lower casing 200 side) in the basic style, the microphone 140 and the microphone 150 are arranged outside the upper casing 100 in the handhold style.

As the upper casing 100 further is rotated about the rotation axis 340, the cellular phone 1200 comes to the desktop style shown in FIGS. 11A and 11B. Even with the cellular phone 1200 being in the desktop style, the microphone 140 and the microphone 150 are arranged outside the upper casing 100.

In the cellular phone 1200 according to the embodiment, the microphone 140 and the microphone 150 are arranged at the upper casing 100 at point symmetrical positions with respect to the rotation axis 340, and the microphone 220 is arranged at the lower casing 200.

In the handhold style shown in FIGS. 10A and 10B, the microphone 140 and the microphone 220 are arranged to be lined in the thicknesswise direction of the cellular phone 1200. In the desktop style shown in FIGS. 11A and 11B, the microphone 150 and the microphone 220 are arranged to line in the thicknesswise direction of the cellular phone 1200. That is, even if the style of the cellular phone 1200 is changed between the handhold style and the desktop style, the other microphone (microphone 140 or microphone 150) is always arranged at a predetermined position with the microphone 220 being a reference.

Even when the cellular phone 1200 according to the embodiment is in the handhold style as well as in the desktop style, therefore, a plurality of microphones are lined in the thicknesswise direction of the cellular phone 1200. This makes it possible to specify the position of a sound source in the thicknesswise direction (forward and backward direction) of the cellular phone, so that a process, such as reducing noise, becomes possible.

Fifth Embodiment

FIGS. 12A, 12B, 13A and 13B exemplify a cellular phone 1300 according to the fifth embodiment. The cellular phone 1300 includes a rotating mechanism 350 which has the guide 301 and a rotation axis 360. The upper casing 100 slides along the guide 301 and rotates about the rotation axis 360.

The microphone 140 and the microphone 150, provided at the upper casing 100, and the microphone 220 provided at the lower casing 200 are arranged in such a way that the microphone 140 and the microphone 220 are lined in the thicknesswise direction of the cellular phone 1300 when the cellular phone 1300 is in a style shown in FIGS. 12A and 12B, and the microphone 150 and the microphone 220 are lined in the thicknesswise direction of the cellular phone 1300 when the cellular phone 1300 is in a style shown in FIGS. 13A and 13B.

The cellular phone 1300 can also specify the position of a sound source in the thicknesswise direction (forward and backward direction) regardless of the style.

The foregoing description of the first to the fifth embodiments has been given of the case where two casings constitute the cellular phone. However, the number of casings constituting the cellular phone is optional, and may be three or more.

The number of axes for changing the arrangement of the casings is not restricted to one axis or two axes. The number of axes is optional, and may be three or more axes.

The structure of the coupling part that couples a plurality of casings is not limited to those of the foregoing embodiments. That is, the coupling part can take any structure as long as the arrangement of a plurality of casings can be changed adequately.

The foregoing description of the first to the fifth embodiments has been given of the present invention as adapted to a cellular phone as an example. However, the present invention is not restrictive to a cellular phone, and can be adapted to a wide range of portable terminals that the arrangement of whose casings is changeable and which acquire voices through microphones.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2007-217651 filed on Aug. 23, 2007 and including specification, claims, drawings and summary. The disclosure of the above Japanese Patent Application is incorporated herein by reference in its entirety.

What is claimed is:

1. A portable terminal device comprising:
a first casing having a plurality of first microphones;
a second casing having a second microphone; and
a coupling part that couples the first casing and the second casing in such a way that the first casing and the second casing are changeable between a first arrangement state and a second arrangement state,
wherein the plurality of first microphones and the second microphone are arranged in such a way that in each of the first arrangement state and the second arrangement state, at least one of the plurality of first microphones and the second microphone are lined in a thicknesswise direction of the portable terminal device.

2. The portable terminal device according to claim 1, wherein the coupling part couples the first casing and the second casing in such a way that the first arrangement state and the second arrangement state are changeable from one to the other by mutually sliding the first casing and the second casing by a predetermined distance,
the plurality of first microphones are arranged in a same direction as a slide direction of the first casing,
an interval between predetermined two of the plurality of first microphones is equal to the predetermined distance, and
the second microphone is lined with one of the predetermined two first microphones in the thicknesswise direction of the portable terminal device in the first arrangement state, and is lined with the other one of the predetermined two first microphones in the thicknesswise direction of the portable terminal device in the second arrangement state.

3. The portable terminal device according to claim 1, wherein the coupling part couples the first casing and the second casing in such a way that the first arrangement state and the second arrangement state are changeable from one to the other by mutually sliding the first casing and the second casing by a predetermined distance and rotating the first casing and the second casing by a predetermined angle, and
the plurality of first microphones and the second microphone are arranged at such positions as to be lined with one of predetermined two first microphones in the plurality of first microphones in the thicknesswise direction of the portable terminal device in the first arrangement state, and be lined with the other one of the predetermined two first microphones in the thicknesswise direction of the portable terminal device in the second arrangement state.

4. The portable terminal device according to claim 1, wherein the coupling part couples the first casing and the second casing in such a way that the first arrangement state and the second arrangement state are changeable from one to the other by mutually rotating the first casing and the second casing by a predetermined angle,
predetermined two of the plurality of first microphones are arranged at positions shifted with a rotation axis of the rotation being a center, and
the second microphone is arranged at such a position as to be lined with one of the predetermined two first microphones in the thicknesswise direction of the portable terminal device in the first arrangement state, and be lined with the other one of the predetermined two first microphones in the thicknesswise direction of the portable terminal device in the second arrangement state.

5. The portable terminal device according to claim 4, wherein the coupling part has a rotation axis extending in the thicknesswise direction of the portable terminal device, and couples the first casing and the second casing in such a way that the first arrangement state and the second arrangement state are changeable from one to the other by rotating the first casing and the second casing by 180 degrees about the rotation axis, the predetermined two first microphones are located at point symmetrical positions with respect to the rotation axis, and the second microphone is arranged at such a position as to be lined with one of the predetermined two first microphones in the thicknesswise direction of the portable terminal device in the first arrangement state, and be lined with the other one of the predetermined two first microphones in the thicknesswise direction of the portable terminal device in the second arrangement state.

6. The portable terminal device according to claim 4, wherein the coupling part has a first rotation axis and a second rotation axis intersecting the first rotation axis, and couples the first casing and the second casing in such a way that the first arrangement state and the second arrangement state are changeable from one to the other by rotating the first casing and the second casing about the first and the second rotation axes, respectively, and the plurality of first microphones and the second microphone are arranged at such positions that the one of the predetermined two first microphones and the second microphone are lined in the thicknesswise direction of the portable terminal device in the first arrangement state, and the other one of the predetermined two first microphones and the second microphone are lined in the thicknesswise direction of the portable terminal device in the second arrangement state.

7. The portable terminal device according to claim 1, further comprising:

an arrangement state determination unit that determines whether the portable terminal device is in the first arrangement state or the second arrangement state, and outputs a determination signal indicating the determined arrangement state;

a specifying unit that receives the determination signal from the arrangement state determination unit, and specifies the first microphone which is lined with the second microphone; and a sound source direction extrapolate unit that performs a sound source direction extrapolate process of extrapolating a position of a sound source with respect to the thicknesswise direction of the portable terminal device using an output signal of the second microphone and an output signal of the first microphone specified by the specifying unit.

8. The portable terminal device according to claim 1, wherein a plurality of second microphones are arranged, and at least one of the plurality of first microphones and at least one of the plurality of second microphones are lined with in the thicknesswise direction of the portable terminal device in the first arrangement state and the second arrangement state.

* * * * *